Oct. 25, 1949.  L. C. EDWARDS  2,485,719
TRAFFIC SAFETY LIGHT
Filed Feb. 4, 1947

INVENTOR.
LEONARD C. EDWARDS
BY *Victor J. Evans & Co.*
ATTORNEYS

Patented Oct. 25, 1949

2,485,719

UNITED STATES PATENT OFFICE 2,485,719

TRAFFIC SAFETY LIGHT

Leonard C. Edwards, Sapulpa, Okla.

Application February 4, 1947, Serial No. 726,376

1 Claim. (Cl. 200—59)

This invention relates to a traffic safety light signal for vehicles.

It is an object of the present invention to provide a traffic safety light signal for use by trucks, buses or other slow moving vehicles to direct traffic which is following the same around it and whereby the traffic approaching from the rear of the truck or bus will be duly warned as to when it is safe for it to pass the truck.

Other objects of the invention are to provide a traffic safety light signal for slow moving vehicles which is of simple construction, which has a telltale indicator in the cab of the vehicle, which is cheap to manufacture, and which is efficient in operation.

Figure 1:
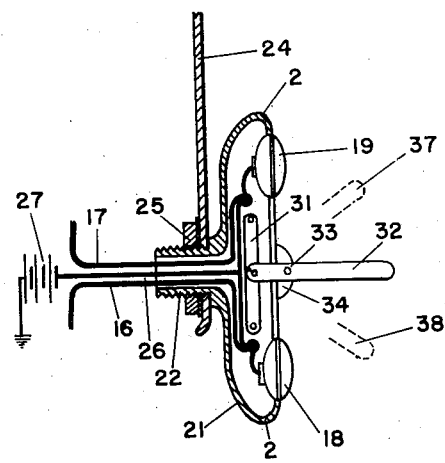
Figure 2:
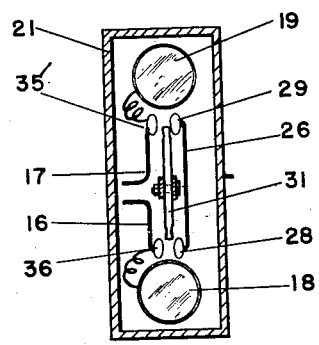
Figure 3:
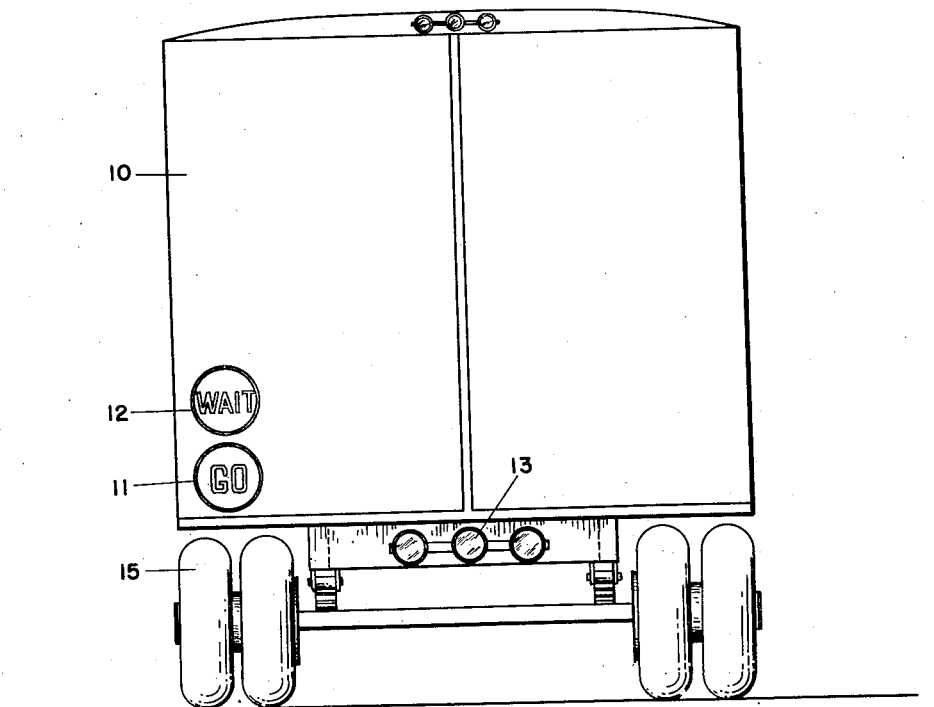

For other objects and for a better understanding of the invention, reference may be had to the following detailed description taken in connection with the accompanying drawing, in which Fig. 1 is a cross-sectional view taken through the switch device disposed on the cab dashboard and having telltale pilot lights, Fig. 2 is a cross-sectional view of the switch device taken on line 2—2 of Fig. 1 and looking in the direction of the arrows thereof, Fig. 3 is an elevational view of the rear of a truck on which are disposed the traffic signals used for warning the traffic which is following it.

On a main highway where there is a great deal of traffic, one often comes up behind a heavy loaded or slow moving truck or bus. One keeps trying to get around the same but the oncoming traffic is so thick that by the time it is possible to do so other vehicles have come up from behind. Often times one will follow a truck for several miles before getting around it. Truck and bus drivers are instructed to watch the traffic in the rear as well as in front. According to the present invention if the truck driver considers it safe for the vehicle trailing him to pass, he will so indicate by turning on the green Go light on the rear of his truck. If it is not safe for the vehicle to pass he will turn on the red light which is marked with the word "Wait." The driver will use the same signals when he thinks it necessary for instructing the rear vehicle as to whether it is safe or not to pass on a hill or curve.

Referring now to the figures, 10 represents a truck on which are disposed a green Go light 11 and a red Wait light 12. These lights are in addition to the usual brake or directional lights 13 which are ordinarily displayed on the rear of the vehicle. The lights 11 and 12 are preferably located over left wheels 15 and adjacent to the side of the vehicle around which the vehicle approaching from the rear is to pass. These lights 11 and 12 are connected respectively by means of wires 16 and 17 to telltale pilot lights 18 and 19 mounted in the front of a switch casing 21 having a threaded sleeve portion 22 which is extended through a dashboard 24 located in the cab of the truck and retained thereon by a lock nut 25. Also extending into the switch casing is a wire 26 extending from a battery or electrical source 27. This wire is connected to contacts 28 and 29 adapted to be engaged by a switch element or contact bar 31 as it is actuated by an operating arm or lever 32 extending from the front of the casing 21 and pivoted as indicated at 33 to a bracket 34 thereon. Adjacent the contact 29 is a contact 35 connected with the red light 19. Adjacent the contact 28 is a contact 36 connected with the green light. As the operating arm 32 is swung to the up position as indicated in dotted lines at 37 the contact terminals 28 and 36 are bridged by the switch element 31 whereby current will be delivered from the battery 27 to the green lights 11 and 18. If the operating arm 32 is moved down to a dotted line position 38, the contact terminals 29 and 35 are bridged and current will be delivered to the red lights 12 and 19 to issue a warning or Wait signal. The lights are grounded in the casing and as the contacts are bridged a circuit is completed from the battery through the wire 26, through the contacts, and through a short wire to the light, the opposie terminals of the light and battery being grounded. The cars in rear of the truck should not pass when these signals are on. When the truck driver determines that it is safe for the vehicles from behind to pass, he will flip the operating handle upwardly to the green light position. When he has no use for the lights and there is no traffic in rear of him he will locate the handle 32 in a neutral position so that the switch element 31 will be out of engagement with the contacts.

Having now described my invention, I claim:

In a pilot light for motor vehicle signals, the combination which comprises an elongated vertically disposed casing having upper and lower lights therein and having means thereon for mounting the casing on an instrument panel of a motor vehicle, said casing having a slot in the face thereof positioned between the said lights, a pair of contacts positioned in the casing with one contact of one of said pairs connected to a terminal of one of the lights of the casing and with a contact of the other of said pairs connected to a terminal of the other of said lights, means connecting the other contacts of each of said pairs of contacts to a battery with the other contact of the battery ground to the casing and one contact of each of said lights grounded to the casing, a lever extended through the slot in the face of the casing and pivotally mounted in the casing, and a contact bar carried by the inner end of the lever and positioned to bridge either of said pairs of contacts alternately for completing circuits to the said upper and lower lights of the casing alternately.

LEONARD C. EDWARDS.

REFERENCES CITED

The following references are of record in the file of this patent:

UNITED STATES PATENTS

| Number | Name | Date |
| --- | --- | --- |
| 1,277,609 | Law | Sept. 3, 1918 |
| 1,893,369 | Jaros et al. | Jan. 3, 1933 |
| 1,893,371 | Knowlton | Jan. 3, 1933 |
| 2,007,084 | Haines | July 2, 1935 |
| 2,044,300 | Heans | June 16, 1936 |
| 2,088,370 | Gingras | July 27, 1937 |
| 2,279,606 | White | Apr. 14, 1942 |
| 2,400,655 | Sais | May 21, 1946 |